United States Patent
Gerstenberger et al.

[11] Patent Number: 5,284,457
[45] Date of Patent: Feb. 8, 1994

[54] BELT GUIDE PULLEY

[75] Inventors: Roland W. Gerstenberger, Asheville; William R. Joyce, Fairview, both of N.C.

[73] Assignee: R. G. Technical Associates, Inc., Arden, N.C.

[21] Appl. No.: 931,844

[22] Filed: Aug. 18, 1992

[51] Int. Cl.$^5$ .............................................. F16H 55/12
[52] U.S. Cl. ........................................ 474/95; 474/184; 474/190; 198/803.01; 198/836.4; 198/843
[58] Field of Search ............................. 474/95–97, 474/148, 150, 184, 187, 189, 190, 273, 902, 903; 492/27, 30, 48, 56, 59; 118/DIG. 15; 198/789, 790, 803.01, 803.2, 836.1, 836.2, 836.4, 837, 841–843

[56] References Cited
U.S. PATENT DOCUMENTS

| | | | |
|---|---|---|---|
| 416,575 | 12/1889 | Davey | 474/903 X |
| 593,646 | 11/1897 | Donovan | 474/903 X |
| 706,917 | 8/1902 | Finch | 474/903 X |
| 769,414 | 9/1904 | Simmons | 474/903 X |
| 937,742 | 10/1909 | Walker | 474/903 X |
| 1,535,369 | 4/1925 | Magley | 474/903 X |
| 1,888,025 | 11/1932 | Chapman | 474/902 X |
| 2,269,821 | 1/1942 | Kemphert et al. | 474/903 X |
| 2,278,982 | 4/1942 | Frolich | 492/59 X |
| 2,322,832 | 6/1943 | Davis | 474/903 X |
| 2,478,262 | 8/1949 | Gay et al. | 492/48 X |
| 2,488,208 | 11/1949 | Lederer et al. | 492/48 X |
| 2,631,358 | 3/1953 | Hill | 492/59 X |
| 3,187,409 | 6/1965 | Glass | 492/48 X |
| 3,739,675 | 6/1973 | Duckett et al. | 492/48 X |
| 3,775,821 | 12/1973 | Somerville | 492/48 X |
| 3,981,237 | 9/1976 | Rhodes | 492/59 X |
| 4,012,961 | 3/1977 | Cameron | 474/190 |
| 5,074,407 | 12/1991 | Brumby | 198/841 |
| 5,102,741 | 4/1992 | Miyabayashi | 492/59 X |
| 5,117,970 | 6/1992 | Gibbs | 198/842 |

Primary Examiner—Ramon S. Britts
Assistant Examiner—Roger J. Schoeppel
Attorney, Agent, or Firm—Carter & Schnedler

[57] ABSTRACT

There is provided a clam shell shaped belt guide pulley having first and second curved halves which are hinged together. Each pulley half has curved inner and outer surfaces. The pulley is adapted to be placed on a large diameter shaft without the need to remove the shaft from the remainder of the machine. There is no supporting structure between the inner surfaces of the pulley halves and the shaft.

19 Claims, 3 Drawing Sheets

BELT GUIDE PULLEY

BACKGROUND OF THE INVENTION

This invention relates to belt guide pulleys. More particularly it relates to belt guide pulleys which may be used with large diameter shafts having a low moment of inertia and a high bending modulus.

Conveyor machines for moving textile articles such as towels and the like often include a plurality of parallel endless belts which operate between spaced apart shafts. Each shaft normally includes a plurality of pulleys which are attached to the respective shafts. The belts ride on the pulleys which maintain the belts in proper alignment. Normally the shafts are made of 1" diameter steel. Because between 50 and 60 pounds or more of force is applied by each belt to the shaft, there are limitations to the length of the shaft and thus the width of the conveyor.

A typical prior art small diameter shaft and pulley system is shown in FIG. 1. Pulley 10 is attached to 1" shaft 12. Pulley 10 includes support web 14 having keyed hole 16 for receiving the shaft. Shaft 12 also includes key 18 which is received in slot 20 of web 14. The key 18 must be machined when the shaft is manufactured thereby increasing the cost. Pulley 10 includes outside surface 22 for making contact with a conveyor belt. Surface 22 may be crowned to keep the conveyor belt in proper alignment.

Typical pulleys having support webs on the inside thereof are shown in U.S. Pat. Nos. 605,104 issued to Knoblock and 1,959,972 issued to Wanamaker. U.S. Pat. Nos. 4,439,173 issued to Fokos, 3,010,332 issued to Skates, and 4,718,544 issued to Herren show pulleys having an internal web structure as set forth above, and also having an additional outer covering for the outside surface of the pulley which, in the case of the Fokos and Skates patents, are initially in two halves.

For wider conveyors larger diameter shafts are used. In some cases the pulleys are machined onto the shaft during the construction of the shaft. In other cases, because of the machining expense, pulleys are omitted and guides adjacent to the shaft are used to keep the belts aligned. These guides cause excessive wear on the belts.

OBJECTS OF THE INVENTION

It is an object of this invention to provide an improved belt guide pulley.

It is another object to provide a conveyor system which utilizes large diameter shafts having pulleys which may be easily attached thereto.

It is another object to provide a conveyor system which utilizes inexpensive and easy to use belt guide pulleys which may be placed on the shaft without the need to remove the shaft from the conveyor machine.

It is another object to provide a conveyor system which utilizes shafts with low moments of inertia and high bending modulii.

It is still another object to provide a conveyor system which utilizes a shaft which does not require special tooling.

SUMMARY OF THE INVENTION

In accordance with one form of this invention, there is provided a belt guide pulley for attachment to a shaft. The pulley is in the form of a clam shell shaped member which includes first and second curved halves. Each half of the clam shell has an inner curved surface and an outer curved surface. A hinge, which is preferably integral with the two halves, connects the first half to the second half. Each half has a free end. The hinge enables the free ends to be moved relative to one another so that the pulley may be readily placed on the shaft.

It is preferred that an adhesive in the form of double sided tape covered by release paper is applied to the inner surface of each half for securing the pulley to the shaft. It is also preferred that the outside surfaces of the pulley be crown shaped to hold the belts on the pulley thereby maintaining proper alignment of the belts. It is also preferred that the outside surface of the pulley be roughened to reduce slipping of the belt.

In accordance with another form of this invention, there is provided a conveyor system with at least one shaft having a diameter of at least 2". At least one belt guide pulley is removably attached to the shaft. The pulley is clam shell shaped having first and second curved halves and a hinge rotatably connecting the first half to the second half. The ratio of the largest outer diameter of the pulley to the outer diameter of the shaft is no more than 1.2 to 1.

In accordance with yet another embodiment of this invention, there is provided a method of applying a clam shell shaped belt guide pulley having two halves each with a hinged end and a free end to a conveyor machine shaft without removing any portion of the shaft from the conveyor machine. The pulley is opened by moving the free end of each half away from the other. The pulley is placed on the shaft so that the inside surface of the pulley contacts the outside surface of the shaft. The inside surface of the pulley is adhered to the outside surface of the shaft.

It is also preferred that the pulley be void of any supporting structure between the inner curves surfaces of each half and the shaft.

Thus by utilizing a clam shell shaped structure a pulley is provided which may be utilized with a large diameter shaft and which may be attached to the shaft without the need to remove the shaft.

BRIEF DESCRIPTION OF THE DRAWINGS

The subject matter which is regarded as the invention is set forth in the appended claims. The invention itself, however, together with further objects and advantages thereof, may be better understood with reference to the following description taken in conjunction with the accompanying drawings in which:

DESCRIPTION OF THE PREFERRED EMBODIMENTS

Figure 1:
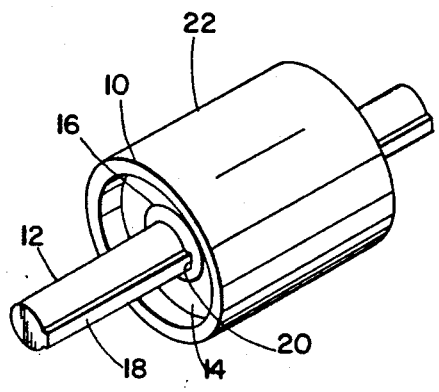
FIG. 1 is a partial pictorial view showing a prior art belt guide pulley attached to a prior art keyed small diameter shaft.
Figure 2:
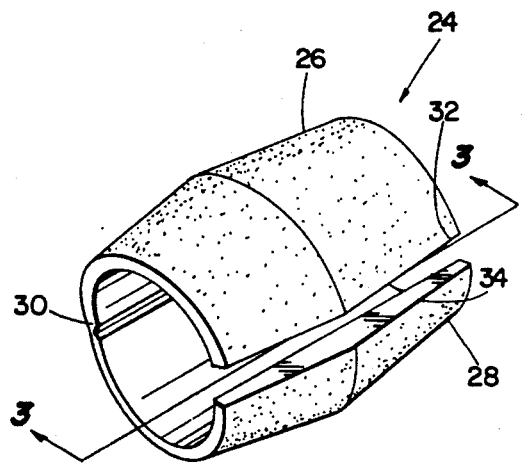
FIG. 2 is a pictorial view showing one form of the belt guide pulley of the subject invention.

Referring now more particularly to FIGS. 2 through 13, there is provided belt guide pulley 24. Pulley 24 is clam shell shaped and includes curved halves 26 and 28. The two halves 26 and 28 are rotatably attached to one another by hinge 30. The halves 26 and 28 and hinge 30 are all integral with one another with the hinge 30 being formed by a weakening or slit in the material which forms the pulley. Half 26 includes free end 32 and half 28 includes free end 34. Preferably the pulley is made of plastic or rubber. Suitable materials are neoprene and nylon.

Figure 3:
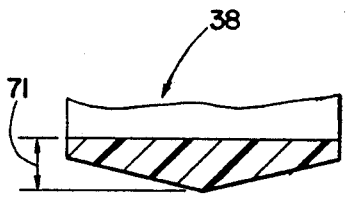
FIG. 3 is a sectional view of FIG. 2 taken through section lines 3—3.
Figure 4:
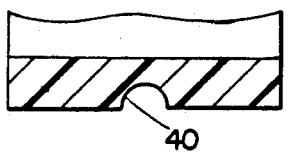
FIG. 4 is a sectional view of an alternative pulley to that shown in FIGS. 2 and 3.
Figure 5:
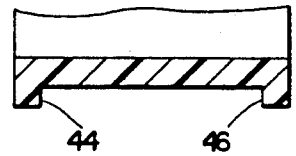
FIG. 5 is a sectional view of another alternative pulley to that shown in FIGS. 2, 3 and 4.
Figure 6:
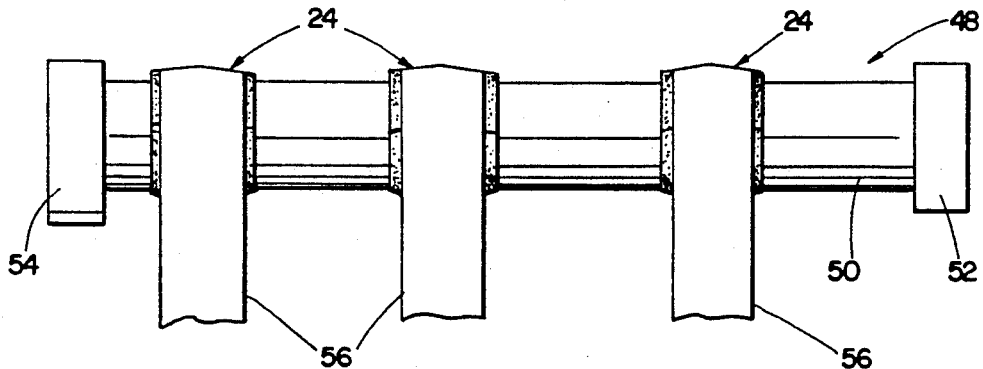
FIG. 6 is a top plan view showing a portion of a conveyor system utilizing the pulleys of FIG. 2 connected to a large diameter shaft.
Figure 7:
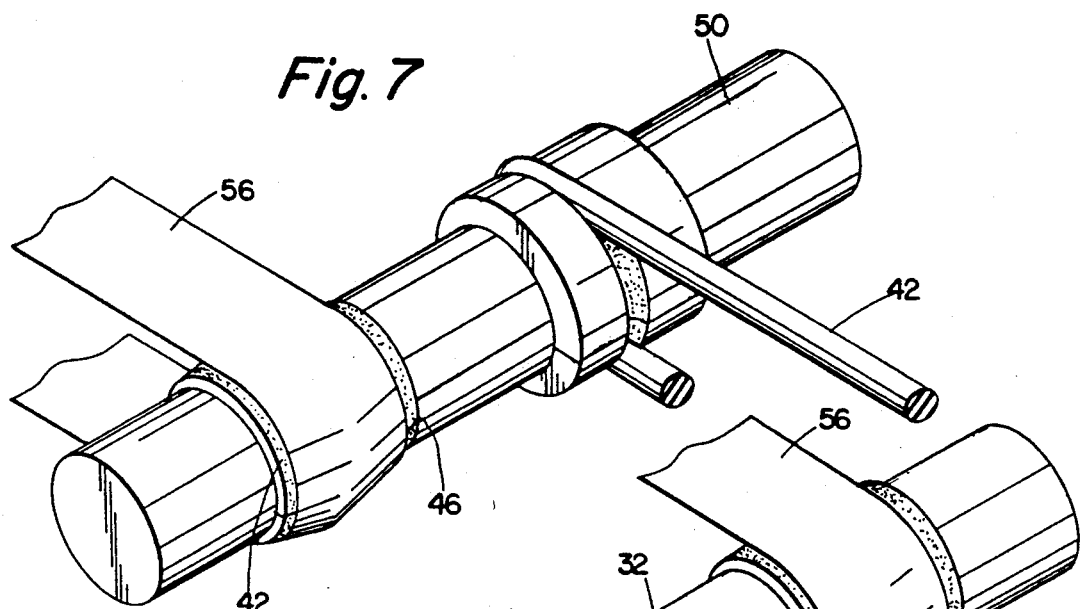
FIG. 7 is a pictorial view showing the pulley of FIG. 2 receiving a conveyor belt, which pulley is connected to a large shaft and showing the pulley of FIG. 4 connected to a drive belt, which pulley is also connected to the large diameter shaft.
Figure 10:
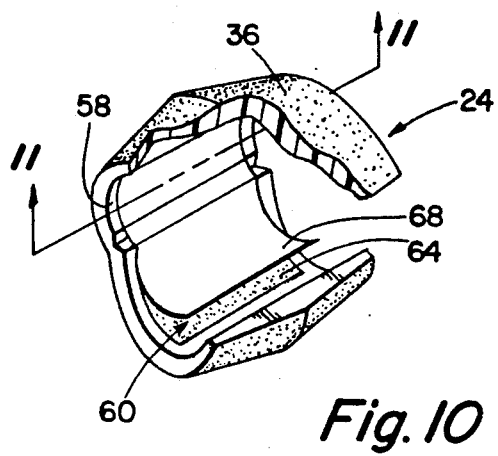
FIG. 10 shows the pulley of FIG. 2 but with a roughened outer surface and with an adhesive system on the inner surface.

It is also preferred that the curved outer surfaces of the halves 26 and 28 be roughened as generally indicated by 36 in FIG. 10. The roughened surface will aid in preventing the belts from slipping. In the preferred embodiment the pulley is crown shaped as best seen in FIG. 3 and is generally indicated by 38. This crown shape causes the belt to stay on the pulley and thus stay in alignment with adjacent belts as shown in FIG. 6. The pulley may be formed in other shapes such as that shown in FIG. 4, which has an elongated U slot 40 which in the embodiment shown in FIG. 7 is used to receive drive belt 42. In addition, the top surface of the pulley could include shoulders 44 and 46 as shown in FIG. 5 which serve to guide the belt.

Pulley 24 is normally used in a multi-belt conveyor system. As can be seen from FIG. 6, a multi-belt conveyor generally indicated at 48 includes a large diameter shaft 50 which is at least 2" in diameter and is preferably 3" in diameter. The ends of the shaft 50 are attached to portions of the conveyor machine generally indicated as 52 and 54 so that access to the shaft is restricted. A plurality of pulleys 24 are attached to shaft 50. A plurality of belts 56 are received over pulleys 24.

Figure 8:
FIG. 8 is a partial pictorial view showing the pulley of FIG. 2 being connected between two other like pulleys on a large diameter shaft.
Figure 9:
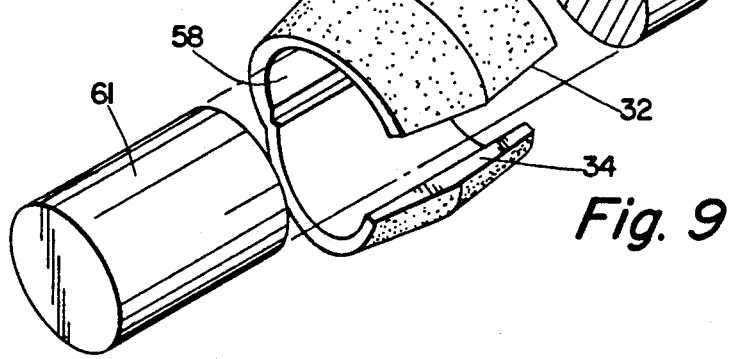
FIG. 9 is a more detailed partial pictorial view of a portion of the pulley and shaft shown in FIG. 8 with parts of the shaft being in phantom for clarity.

In order to place a pulley 24 onto shaft 50, it is merely necessary to move free ends 32 and 34 away from one another, thereby opening the clam shell so that the distance between the free ends is at least the diameter of shaft 50. This attachment procedure is best illustrated in FIGS. 8 and 9.

Figure 11:
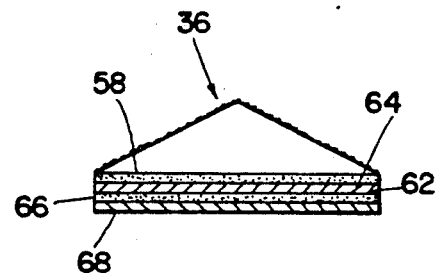
FIG. 11 is a sectional view of FIG. 10 taken through section lines 11-11.

Once the clam shell pulley is received over the shaft 50, the inside surface 58 of each half contacts the outside surface 60 of the shaft. Although it is possible that the tension of the belts 56 will hold the pulley in place, it is preferred that the inside surface 58 be adhered to the outside surface 60 of the shaft. This is best accomplished by the use of a suitable adhesive such as contact cement or two sided adhesive tape and release paper as illustrated in FIGS. 10 and 11. Double sided adhesive tape as generally indicated as 60 is placed on the inside surface 58 of each half. The tape includes backing 62. Adhesive layer 64 makes direct contact with the inside surface 58 each clam shell half and adhesive layer 66. Release paper 68 is received over adhesive layer 66. Release paper 68 is removed from each half at the time that the pulley is to be placed onto shaft 50. In addition, it is preferred that free ends 32 and 34 be glued together once the pulley is fully installed on shaft 50.

Figure 12:
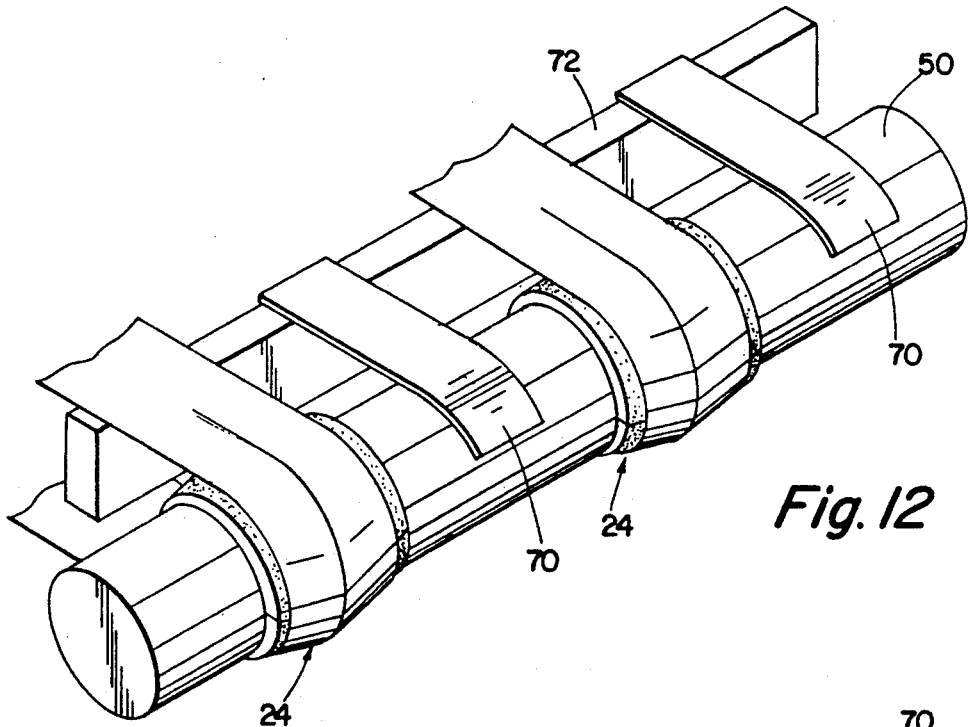
FIG. 12 is a partial pictorial view showing the pair of pulleys of FIG. 2 connected to a large diameter shaft and a pair of transfer fingers.
Figure 13:
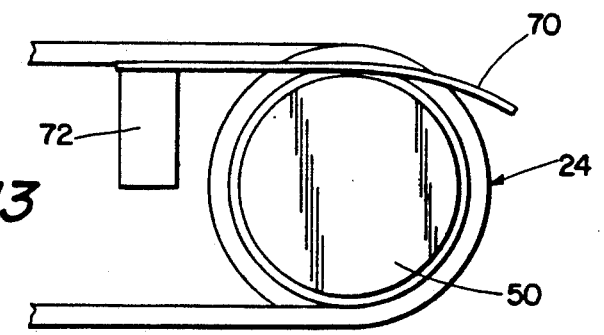
FIG. 13 is a side elevational view of the apparatus shown in FIG. 12.

The preferred maximum thickness of the crown pulley shown in FIG. 3 is ¼" as indicated by 70 measured from the top of the crown to the inside surface 58. Thus the resulting diameter at its maximum of the combination of the 3" shaft 50 and crown pulley is approximately 3½". The ratio of the pulley outer diameter to the shaft outer diameter is 1.2 to 1 or less, again measured from the top of the crown. The construction results in a low moment of inertia for the shaft, which is preferably less than 100 inch pounds. In addition, because of the use of the large 3" diameter shaft, as compared to the prior art 1" diameter shaft as shown in FIG. 1, the shaft has a much higher bend modulus and can withstand much higher forces than a standard 1" shaft. In addition a longer shaft and thus a wider conveyor may be used. The pulleys described above may be readily replaced when they are worn out without the need to remove the shaft from the machine thereby eliminating a costly procedure which stops production for an extended period of time and is labor intensive. While the pulleys represent only a ¼" buildup from the outside surface 61 of the shaft, there is sufficient room to provide transfer fingers 70 between adjacent pulleys 24 as shown in FIG. 12. Transfer fingers 70 are supported by bar 72 which is positioned adjacent to shaft 50. These transfer fingers 70 enable a smooth transition of the material being conveyed to an adjacent conveyor section.

Thus there is provided a clam shell shaped pulley particularly useful with a large diameter shaft thereby enabling one to use high tension multiple belts without the fear that the shaft will bend excessively. The pulley may be easily placed on the shaft without the need to remove the shaft from the conveyor. The pulleys are inexpensive to manufacture and easy to use without substantial training time and do not require a specially machined shaft.

From the foregoing description of the preferred embodiments of the invention, it will be apparent that many modifications may be made therein without departing from the true spirit and scope of the invention.

What is claimed is:

1. A belt guide pulley for guiding a belt adapted to be attached to a shaft comprising:

a unitary clam shell shaped member; said member including first and second curved halves; each half having an inner curved surface and an outer curved surface; said outer surface contacting the belt; said outer surface shaped so as to prevent the belt from slipping from said member; each half having a free end;

a weakened section on said member and located between said free ends; said weakened section connecting said first curved shaft to said second curved half; said weakened section enabling said free ends to be moved relative to one another whereby said member may be readily placed on the shaft.

2. A pulley as set forth in claim 1 wherein the outer surface of each half is roughened.

3. A pulley as set forth in claim 1 wherein said outer curved surface of each half is crown shaped.

4. A pulley as set forth in claim 1 wherein said outer curved surfaces of each half includes a groove extending around the periphery of said pulley.

5. A pulley as set forth in claim 1 wherein said member is substantially void of any supporting structure between the inner curved surfaces of each half.

6. A pulley as set forth in claim 1 further including an adhesive applied to said inner surface of each half whereby said member may be adhered to said shaft.

7. A pulley as set forth in claim 6 further including release paper attached to said adhesive.

8. A pulley as set forth in claim 1 wherein the thickness of said member is no greater than $\frac{1}{4}''$.

9. A pulley as set forth in claim 1 wherein said member is made of plastic.

10. A pulley as set forth in claim 1 wherein said member is made of a rubber material.

11. A conveyor system comprising:
   at least one shaft; said shaft having a diameter of at least 2";
   at least one unitary belt guide pulley for guiding a belt removably attached to said shaft; said pulley being clam shell shaped having first and second curved halves and a weakened section connecting said first and second halves together enabling said halves to be rotated; said pulley having an outer surface; said outer surface contacting the belt; said outer surface shaped so as to prevent the belt from slipping from said pulley; the ratio of the largest outer diameter of said pulley to the outer diameter of said shaft being no more than 1.2 to 1.

12. A conveyor system as set forth in claim 11 further including at least one transfer finger located adjacent to said pulley.

13. A conveyor system as set forth in claim 11 wherein the moment of inertia of said shaft/pulley is less than 100 inch pounds.

14. A conveyor system as set forth in claim 11 wherein said pulley is crown shaped.

15. A conveyor system as set forth in claim 11 wherein said pulley is attached to said shaft by an adhesive.

16. A conveyor system as set forth in claim 11 wherein said pulley is substantially void of supporting structure between the inside surface of each half and the outside surface of said shaft.

17. A conveyor system a set forth in claim 11 wherein the outer diameter of said shaft is 3".

18. A method of applying a unitary clam shell shaped belt guide pulley for guiding a belt having (a) two halves, each half having an outer surface, said outer surface contacting the belt, said outer surface shaped so as to prevent the belt from slipping from said pulley, (b) a weakened section connecting said halves together, and (c) each half having a free end, to a conveyor machine shaft without having to remove any portion of the shaft from said conveyor machine, comprising the steps of:
   opening said pulley by moving the free ends of each half away form each other;
   placing said pulley on said shaft so that the inside surface of each pulley half contacts the outside surface of said shaft;
   adhering said inside surface of each pulley half to the outside surface of said shaft.

19. A method as set forth in claim 18 further including the step of adhering said free ends to one another.

* * * * *